Dec. 10, 1935. H. HALPERIN ET AL 2,023,583
OIL SUPPLY SYSTEM FOR CABLES
Filed Jan. 17, 1931
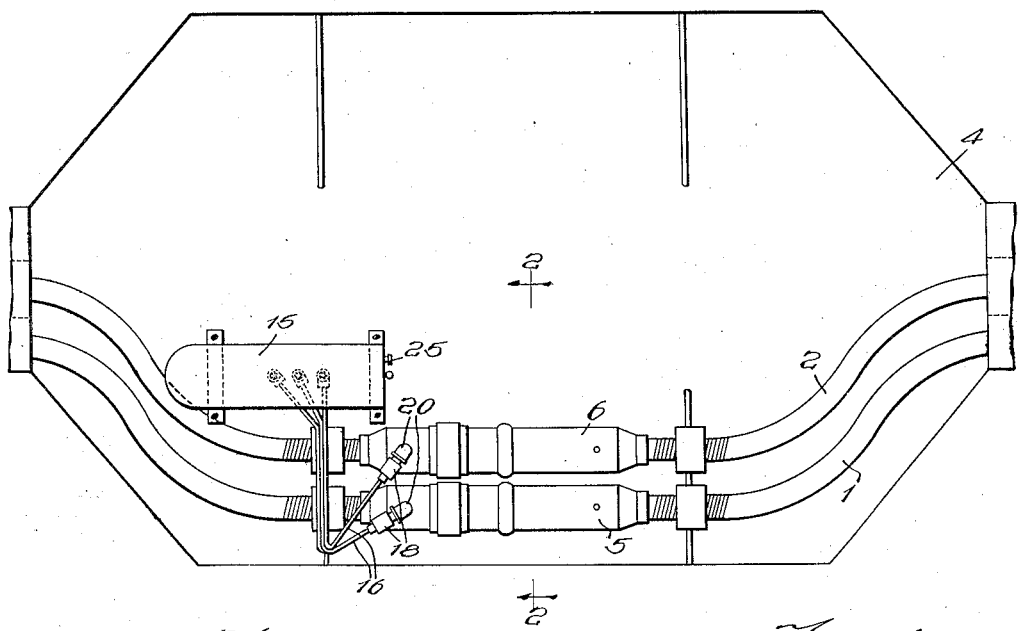
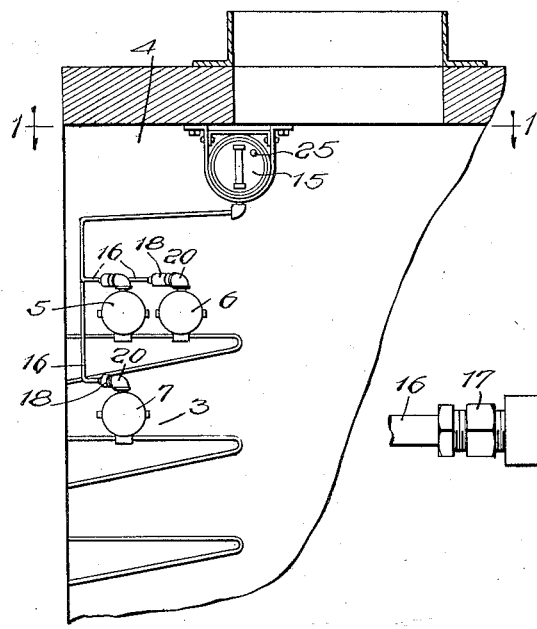
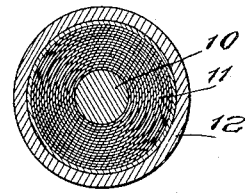
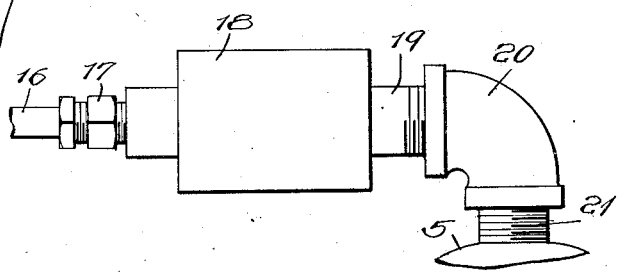
Inventors
Herman Halperin
Alexander E. Thoms Patented Dec. 10, 1935

2,023,583

UNITED STATES PATENT OFFICE 2,023,583

OIL SUPPLY SYSTEM FOR CABLES

Herman Halperin and Alexander P. Thoms, Chicago, Ill.

Application January 17, 1931, Serial No. 509,320

1 Claim. (Cl. 173—264)

This invention relates to electric cables in general and more particularly to underground cables used on medium or high voltages, and is especially concerned with the maintenance of the integrity and improvement of the insulation at and near the joints in a cable system.

Consider a high voltage cable of the "solid" or "ordinary" non-oil filled type wherein the insulation generally consists of fibrous material, such as paper, suitably impregnated with an insulating compound and contained in a sheath of lead with or without an extra covering, such as jute and armour. In such cable, migration of oil, or impregnating compound is inhibited, but not completely prevented, due to the absence of any substantial oil passageways. For such cables operating at 12 kv., for instance, it has been current practice to fill the joints between adjacent lengths of cable with a hard or viscous compound, which would not flow or would flow at a very slow rate at room temperature. As the use of cables extended to higher voltages, it was found desirable, from an electrical standpoint, to use oils for filling the joints on the higher voltage cables, such as 33 kv., and higher voltages. In some cases oils are used for even voltages below 33 kv. These oils remain fluid down to temperatures of about minus 20° C. and often are fluid down to temperatures of about minus 40° C.

For the so-called "ordinary" type of impregnated paper insulation, the paper is usually impregnated before the lead sheath is applied while the reverse is true for the usual method of making oil-filled cable. For the ordinary insulation, the impregnating compound is fluid down to about 10° C. Due to the method of manufacturing the ordinary cable, there are voids in the insulation and due to handling the cable, slight wrinkles form in the lead sheath. Because of these conditions, oil from the oil-filled joints migrates into the cable to fill the spaces, such as the voids in the insulation and localized gaps between the insulation and the lead sheath.

From the standpoint of the electrical strength of the joint, it is essential that the joint be kept full of oil at all times, and, to counterbalance the tendency of the oil to migrate into the cable, reservoirs containing oil are connected to the oil-filled joints. It has been found from visible inspection and from feeling the insulation, that the oil from the joint will travel 15 to 50 feet and even more from the joint into the cable in a short time. The distance depends on a number of factors, such as the viscosity of the impregnating compound, viscosity of the joint filling oil, pressure on the oil, current loading of cables, and elevation of cables.

Up to the time of our invention, it was common practice for higher voltage cables with the ordinary type of insulation to fill the joints and reservoirs with oil saturated with air, that is, containing about 10% air by volume at atmospheric pressure and room temperature. One common method was to use a rigid cylindrical tank as a reservoir. This reservoir, which might have an internal volume of 6 gallons when used for feeding three 66 kv. joints, would be connected by means of small pipes to joints. The reservoir would be filled 50% or a little more with the ordinary oil and the space above the oil would contain the manhole air. The tank was then sealed off. This filling, of course, would include filling of the pipes between the reservoir and joint, or joints. With the above arrangement, the operation would usually be somewhat as follows:

1. Oil would migrate from the joint into the cable, the volume of oil in the reservoir would decrease, and the volume of air in the reservoir would increase, resulting in a vacuum throughout the oil system and inside the cable adjacent to the joint.

2. After the oil level had decreased to a predetermined allowable amount, the field inspector would arrange for the reservoir to be opened and oil added to bring the level back to normal.

The outstanding disadvantages of the above scheme are as follows:

(a) The oil contains air which contains the very undesirable constituent oxygen. During operation the voids in the cable insulation are filled with this oil containing oxygen and incidental to the heating and cooling and to the formation of vacua inside the cable sheath, some of the oxygen becomes free.

(b) Oxygen in the oil is undesirable as it promotes deterioration in the oil when it is subjected to electrical stress, and free oxygen is very undesirable from this standpoint because it greatly accelerates the deterioration of insulation under stress. In general, the dielectric strength of impregnated insulation is higher when it is under pressure than when under vacuum as it may be when in this system.

(c) Due to the existence of the vacuum inside the joint, cable, reservoir and fittings, a leak in any one of these parts would result in moisture from the air or water from the manhole or adjacent conduit entering the insulation and oil. Moisture and water are also very undesirable from the standpoint of electrical strength of insulation and oil, and result in ultimate failure of the cable.

To remedy these difficulties it has been proposed, in the past, to use oil under pressure at the joints. The oil was contained in an expansible reservoir or sylphon which was always full of oil, pressure being applied externally at the sylphon. Ordinary oil with the undesirable ingredients of oxygen and slight amount of moisture were used. This system did not remove the disadvantages in the prior system by reason of the presence of oxygen and, further, in so far as it did provide an advantage by placing the oil under pressure it carried with it a corresponding disadvantage in so far as concerns the matter of cost since the sylphon or expansible reservoir used is very expensive.

We have devised a system which overcomes the difficulties in systems such as have been above described and which is inexpensive as regards the initial cost as well as maintenance after installation. The first system developed by us, briefly stated, was as follows:

1. After the three joints of a line are made in a manhole and filled with oil, they are connected to a constant volume tank.

2. Vacuum is drawn on the tank and the joints for about 15 minutes, thereby removing most of the air in the oil in the joints.

3. The tank is half filled with nitrogen saturated oil. This oil has been previously degasified, that is, freed of air and moisture and then saturated with dry nitrogen gas.

4. The space above the oil is filled with dry nitrogen until the pressure is about 10 pounds per square inch. Then the oil and gas in the tank are sealed from the outside.

5. In operation, as the oil migrates in the cable and oil flows from the reservoir into the joint, the gas in the reservoir expands and the pressure drops. When this pressure becomes a few pounds per square inch, nitrogen-saturated-oil and nitrogen gas are added to restore the tank to normal conditions again.

In connection with item 1 above, the oil in the joints of our initial construction was not of the nitrogen saturated variety because of the additional expense of doing this. We have found this quite satisfactory. In later installations, which will be hereinafter referred to as our second system, nitrogen saturated oil was used for filling the joints themselves. The joint with the tank connected thereto is initially evacuated to remove practically all of the air not only from the joint and tank but also from the connections between the two. Thereafter air-free, moisture-free oil that has been saturated with nitrogen is introduced to fill the joint, the connections and about half of the tank, the remaining space in the tank being filled with dry nitrogen gas under pressure, as outlined above.

According to technical literature, nitrogen gas is an inhibitive to deterioration of insulation under electrical stress. Another gas that has a similar characteristic is carbon dioxide which may be used when specially dried. This gas, however, was not used in our system because oil has a much greater affinity for it than for nitrogen and not only would more of the carbon dioxide be required, but there would be more chance of a larger volume of this gas becoming free inside the insulation during operation than would be the case with nitrogen. It is desirable that there be as little free gas as possible in the insulation from the standpoint of electrical strength. Also, from the standpoint of operation, it was thought that nitrogen would result in less pressure variations due to changes in temperature than carbon dioxide, a condition which is desirable.

As indicated in the above, the two new systems have, briefly, the following advantages over the old system:

1. Most or all of the air containing oxygen is replaced by an inert gas.

2. Insulation in cable adjacent to joint is under pressure at all times minimizing the possibilities of free gas existing in insulation and resulting in general improvement of insulation from an electrical standpoint.

3. Oil supply system and inside cable are under positive pressure to prevent the entrance of moisture or water through leaks that may develop.

Looking at the matter in a broad way, one should start with the consideration that in general terms the electrical strength per unit thickness of insulation is one-half as much for the insulation in the middle of a length of cable containing the ordinary type of insulation as compared to the strength of the oil-filled type of insulation, such as has been used on 132 kv. lines. On the oil-filled insulation the past practice has been to remove more of the air and moisture from the dry paper than was done for the ordinary type of insulation, and then thoroughly saturate the inside of the sheath with an oil that has been freed of gases and moisture. This oil, through a special system, is always kept under positive pressure.

On account of the methods of manufacture, it has been found from operating experience that the insulation of a cable with the ordinary type of insulation is lower in dielectric strength in that portion of the cable at the end of a length than for the portion at the middle of a length. The use of oil-filled joints tends to counterbalance or reverse this difference. It should be noted that it is also this cable adjacent to the joints that receives the most handling during installation and the most bending during operation incidental to temperature changes due to load variations and seasonal changes. (Operating experience shows that the rate of failures per foot of cable is about ten times as high for the cable in the manhole as for the average of all the cable in a transmission line). In other words, our invention results in the insulation of the cable near the joint approaching very closely in quality the insulation in the best quality of insulation now known to the art.

Since a cable connected in a system such as above set forth tends to improve with time as the oil permeates the paper insulation, it is possible to use a cheaper and less perfectly made cable than heretofore while maintaining the same relative degree of safety and electrical losses. It is known, in connection with systems of the past, that an inferior cable may be satisfactory for a short period of time but such a cable should not be used because the defects will manifest themselves in a short time, and accelerate the deterioration of the cable. As pointed out above, our cable improves as the oil permeates the insulation. Therefore, if the defects in a cable as initially installed are not too great and the cable is serviceable for a period of time long enough to permit the oil to penetrate the insulation then the improvement due to the oil will offset the initial defects and the cable will be rendered as good as the better cables of the past. In this connection it should be noted that the portion of the cable closest to the joint, which is electrically the weakest portion of the cable, is the portion to be first impregnated and improved. The oil that permeates the cable does not contain a very large amount of dissolved gas, hence there is very little likelihood that large amounts of gas will be liberated within the cable due to temperature changes and the resulting changes in pressure.

Reference may now be had to the accompanying drawing illustrating a concrete exemplification of our invention.

In the drawing:

Figure 1 is a plan view showing the cables within a manhole, said view being taken along the line 1—1 of Figure 2;

Figure 2 is a fragmentary sectional view taken along the line 2—2 of Figure 1;

Figure 3 is a fragmentary view showing the assembly of the fittings at the joint sleeve; and Figure 4 shows a section of the cable used.

Reference may now be had more particularly to the drawing which illustrates the joints and adjacent portions of a cable system to which our invention has been applied. We have illustrated three single conductor cables 1, 2, and 3 which may constitute three conductors of a three phase system. The conductors 1, 2, and 3 extend into a manhole 4 and are connected to corresponding outgoing conductors by means of suitable joints indicated at 5, 6, and 7 respectively.

The cables may be of any preferred construction and in Figure 4 we illustrate a sectional view taken through a standard form of cable to which our invention is applicable although the invention it not limited to this precise type of cable. The cable includes a copper conducting core 10 surrounded by spirally wound paper insulation 11 and an outer lead sheath 12. The paper is impregnated with an insulating compound which is fluid down to about 10° C. Figure 4 is merely illustrative of one standard form of cable to which our invention has been applied, it being understood that other standard forms may be used.

The joints 5, 6, and 7 are of identical construction and may be of any preferred form known in the art. In the first mentioned system each joint of the three joints on a line in a manhole is initially filled with ordinary thin transil oil containing air and each joint is kept at 25 lbs. per square inch to determine the presence of leaks or the like. After the satisfactory completion of the third joint in a manhole all three joints are connected to a reservoir 15 by means of copper tubing and suitable fittings. A fitting suitable for this purpose is illustrated in Figure 3. A copper tube 16 which connects with the reservoir 15 extends to a threaded compression fitting 17 and is thereby connected to an insulating sleeve 18 which has a nipple 19 extending therefrom and connected to an elbow 20. A filling nipple 21 extends between the elbow 20 and the joint 5. A vacuum pump is then connected to the tank 15, as at the nipple 25, and the entire installation is evacuated for a period of about fifteen minutes. Preliminary tests indicate that this process removes most of the air from the oil. The tank 15 is then half filled with nitrogen saturated oil which has been previously degasified, that is, freed of air and moisture and then saturated with dry nitrogen gas. The space above the oil is filled with dry nitrogen until the pressure is about 10 lbs. per square inch. Then the oil and the gas in the tank are sealed from the outside. In the operation of this system, as the oil migrates in the cable and oil flows from the reservoir into the joint, the gas in the reservoir expands and the pressure drops. When this pressure becomes a few pounds per square inch, nitrogen saturated oil and nitrogen gas are added to restore the tank to normal conditions again.

As a modification of the above procedure we have developed a second system wherein the joints may be initially filled with nitrogen saturated air-free and moisture-free oil instead of with oil containing air as above outlined. This oil is introduced into the tank after the tank, the connecting fittings and the joint have been exhausted of the air. The oil initially fills about one half of the volume of the tank, the remaining space being filled with dry nitrogen gas under pressure. Thereafter we proceed in the same manner as in the first mentioned system.

It has been proposed to use carbon dioxide instead of nitrogen for maintaining the pressure upon the oil within the tank 15. We have, however, found that nitrogen is by far preferable to carbon dioxide. There is less trouble in obtaining full saturation of the oil by nitrogen, which the oil absorbs to the extent of about nine percent of its volume, as compared to carbon dioxide which the oil absorbs to the extent of about one hundred percent of its volume. Not only would more of the carbon dioxide be required, but also, there would be more chance of a larger volume of this gas becoming free inside the insulation during operation than would be the case with nitrogen. From the electrical standpoint it is desirable that there be as little free gas as possible within the insulation of the cable.

While we speak of the oil as being saturated with nitrogen the invention is not limited thereto since we may use oil which is only partially saturated with nitrogen. The oil is, however, charged with nitrogen to an appreciable extent. The invention is, also, not limited to the use of nitrogen gas exclusively since any inert gas having a solubility in oil approximating the extent of the solubility of nitrogen may be used. While the present invention has been illustrated as embodied in a system using single conductor cables it is to be understood that the invention is equally applicable to three conductor cables or to cables having any other number of conductors.

What we consider new and desire to secure by Letters Patent is:

The combination adaptable for use in manholes of a cable system, of means for uniting adjacent ends of cables, which cables are free of longitudinal ducts or external openings and comprise conductors wrapped with fibrous insulation impregnated with a semi-viscous compound and covered with lead sheaths, comprising a closed joint evacuated of free oxygen and moisture and provided with a filling of a thin insulating oil substantially free of oxygen and moisture, a communicating oil reservoir containing a partial filling of like thin insulating oil substantially free of oxygen and moisture, said oil in the joint and in the reservoir being substantially saturated with dry nitrogen gas, and an isolated body of dry nitrogen gas at a pressure substantially in excess of atmosphere above and in contact with the oil in the tank, said tank being a rigid constant volume chamber completely closed off from atmosphere and preventing the escape of gas therefrom during any increase of pressure occasioned by heating of the cable and expansion of oil thereinto and preventing the entrance of external fluids into either the joint or the reservoir during periods of cooling off of the cable, said chamber being designed to take up resiliently the expansion of oil in the cable due to heating, without the development of pressures which would be injurious to the cable sheath, whereby the insulation of the joint is maintained and the insulation of the cable ends communicating with the joint is materially improved.

HERMAN HALPERIN.
ALEXANDER P. THOMS.